United States Patent [19]

Takahashi

[11] Patent Number: 4,564,936
[45] Date of Patent: Jan. 14, 1986

[54] TIME DIVISION SWITCHING NETWORK

[75] Inventor: Kenichi Takahashi, Kawasaki, Japan

[73] Assignee: Nitsuko Limited, Kawasaki, Japan

[21] Appl. No.: 618,411

[22] Filed: Jun. 6, 1984

[30] Foreign Application Priority Data

Jun. 6, 1983 [JP] Japan .................. 58-100627

[51] Int. Cl.[4] .......................... H04Q 11/04
[52] U.S. Cl. ........................ 370/58; 370/67
[58] Field of Search ........... 370/67, 66, 68, 58, 370/64, 59

[56] References Cited

U.S. PATENT DOCUMENTS

| | | | |
|---|---|---|---|
| 3,466,397 | 9/1969 | Benowitz et al. | 370/66 |
| 3,673,336 | 6/1972 | Thomas | 370/67 |
| 3,881,064 | 4/1975 | Schlichte | 370/67 |
| 3,996,566 | 12/1976 | Moran | 370/67 |
| 4,138,597 | 2/1979 | Ashford | 370/67 |

*Primary Examiner*—Douglas W. Olms
*Attorney, Agent, or Firm*—Roberts, Spiecens and Cohen

[57] ABSTRACT

An equipment for interchanging time slots of time division multiplex signals on a plurality of highways. Data bit signals in respective time slots incoming on respective highways are one-bit delayed at one after another of the highways by shift registers of different stages and are converted into parallel data at respective serial-parallel converters. The parallel data of respective time slots are read out from the converters sequentially and are stored in different addresses in a speech memory over the entire frame of each highway in response to the sequential clock pulses. The data stored in the speech memory are read out at every intervals of adjacent clock pulses and are distributed to respective parallel-serial converters connected to different highways in response to the time intervals of the clock pulses. The addresses of the speech memory to be accessed in the read-out operations are obtained from an address control memory in which the address data are written by a central control unit. Thus, a desired time slot interchange is performed according to the address data stored in the address control memory and the data signals interchanged are transmitted onto output highways. Shift registers are used for matching time slots on output highways.

7 Claims, 6 Drawing Figures

TIME DIVISION SWITCHING NETWORK

BACKGROUND OF THE INVENTION

(1) Field of the Invention

The present invention relates to a time division multiplex communication system, and more particularly, to a time division switching network used in such a system.

(2) Description of the Prior Art

In a time division multiplex communication system, a plurality of channels are assigned to a plurality of time slots in a repetition period or a frame so that digital data signals of the channels can be transmitted through a common transmission line or a highway, as well known in the prior art. In order to exchange different channels from one another on a highway or different highways, the time division switching network is used wherein digital data signals in time slots of different channels to be exchanged are replaced with one another.

A known time division switching network used for a plurality of highways includes a plurality of time-slot shifters or time switches (which will be referred to as "T-switch") and a highway switch or space switch (which will be referred to as "S-switch"). The T-switch is for replacing digital data signals between time slots of different channels on a highway, and has a speech memory of, such as a random access memory (RAM), for temporarily storing digital data signals in time slots in each one frame on the highway. The stored digital data signals are read out in an order indicated by a central control unit so as to replace the digital data signals between time slots of different channels. The S-switch has a gate matrix circuit connected to the plurality of highways, which is also controlled by control data from the central control unit so that digital data signals are replaced between time slots of different highways.

The known time division switching network is complicated in the circuit because a plurality of speech memories are used for a plurality of highways, respectively, so that a plurality control circuits are required to control the message memories, respectively. Further, a control circuit for the gate matrix of the S-switch is also necessary.

SUMMARY OF THE INVENTION

Therefore, it is an object of the present invention to provide a time division switching network which is simple in circuit formation.

In a time division switching network for interchanging time slots on a plurality of (N) highways, each highway transmitting a time division multiplex signal, each one frame of the time division multiplex signal having a predetermined number (n) of time slots assigned to n channels respectively, and each time slot having a plurality of (m) data bits with predetermined time intervals, the present invention comprises N input highways receiving incoming time division multiplex signals, N output highways transmitting the time division multiplex signals as exchanged, and clock pulse generator means generating clock pulses in phase of the data bits. N buffer memory means are connected to N input highways and stores data in the time slots inputted thereto. A first random access memory is provided to the network and has a plurality of addresses, the number of which is equal to a product of the predetermined number (n) of the time slots in one frame and the number (N) of the input highways. First means writes one time slot data stored in the N buffer memory means into respective addresses in the first random access memory in response to the clock pulses. Second means reads out the data stored in respective addresses in the first random access memory onto respective ones of the N output highways in response to every time intervals between adjacent clock pulses. A second random access memory stores address data of said first random access memory to be accessed by the second means, and a central control unit for writing the address data into the second random access memory. Third means matches time slots on the N output highways.

The N buffer memory means comprises N shift registers having outputs and N serial-parallel converters connected to the outputs of the shift registers, respectively. The N shift registers have different number of stages one by one.

The first means comprises a common data bus connected to the N serial-parallel converters, a channel counter counting up the clock pulses, N first gate means being opened by the clock pulses and connected to the N serial-parallel converters, respectively, and an access signal generator means for selecting one of the N first gate means in dependence on the count number of the channel counter and sending out an access signal to the selected one of the N first gate means. Therefore, one of the N serial-parallel converters is accessed by the access signal and the one time slot data in the one serial-parallel converter are written into an address given by the count number of the channel counter of the first random access memory through the common data bus.

The second means comprises N parallel-serial converters being connected to the common data bus, N second gate means being opened by every intervals between adjacent ones of the clock pulses and connected to the N parallel-serial converters, respectively. The access signal generator means also selects one of the N second gate means independent of the count number of the channel counter and sends out the access signal to the selected one of the N second gate means. Therefore, one of the N parallel-serial converters is accessed by the access signal to take thereinto the data read out onto the common data bus from the first random access memory.

Further objects, features and other aspects of the present invention will be understood from the following detailed description of preferred embodiments in connection with the accompanying drawings.

BRIEF DESCRIPTION OF PREFERRED EMBODIMENTS

Prior to description of embodiments of the present invention, a known time division switching network will be described in connection with FIGS. 1–3.

Figure 1:
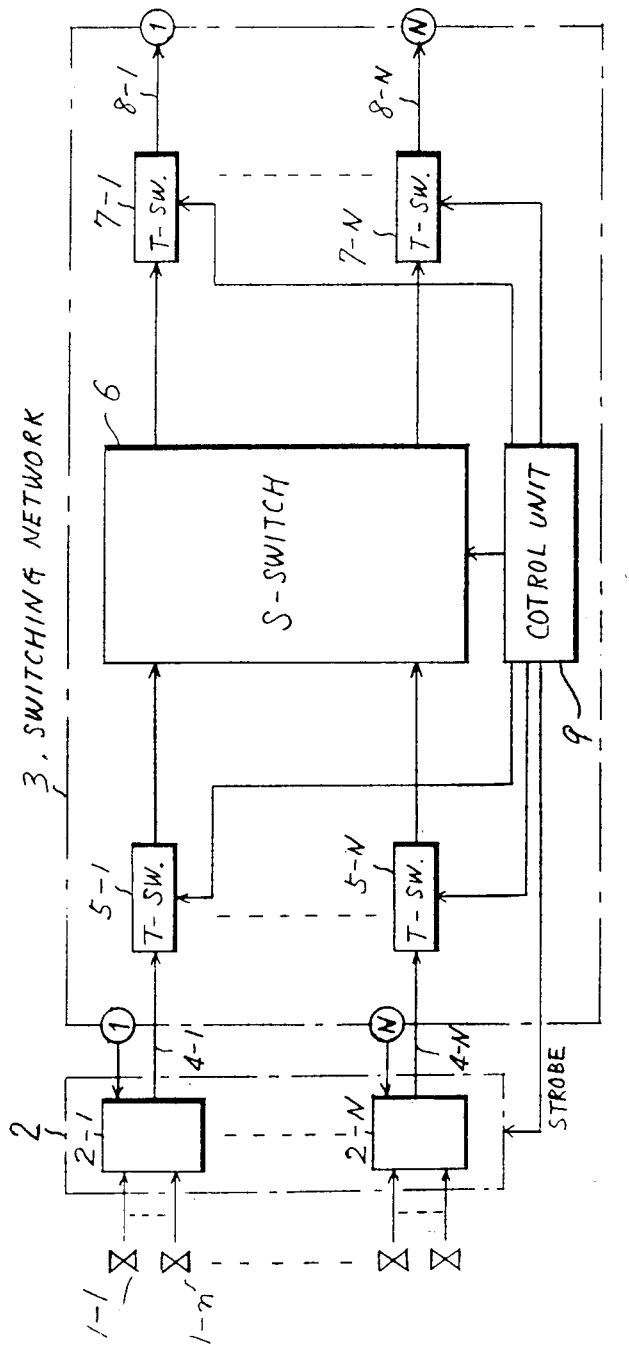
FIG. 1 is a schematic block diagram view of a known time division switching network.

Referring to FIG. 1, a plurality of (N) groups of n terminal equipments 1-1-1-n such as telephone subscribers are connected to N line collectors 2-1-2-N, respectively, in a terminal interface 2. Each line collector converts voice signals inputted from terminal equipments 1-1-1-n thereto into digital data signals and sends out them as time division complex signals on a corresponding highway 3. That is, the converted digital data signals are transmitted from interface 2 to a time division switching network 3 through time division channels on highways 4-1-4-N corresponding to line collectors 2-1-2-N, respectively.

One frame of the time division multiplex signal on each one highway has n time slots assigned to the n channels, respectively, and is sent out to the highway in response to a strobe pulse inputted to interface 2 from a control unit which will be described hereinafter.

The plurality of highways 3-1-3-N are connected to T-switches 5-1-5-N, respectively, outputs of which are connected to an S-switch 6. Outputs of S-switch 6 are connected to T-switches 7-1-7-N, outputs of which are connected to terminal interface 2 through output highways 8-1-8-N.

T-switches 5 and 7 and S-switch 6 carry out to exchange channels under control by the control unit 9, which sends out to interface 2 strobe pulses, as described above.

Figure 2:
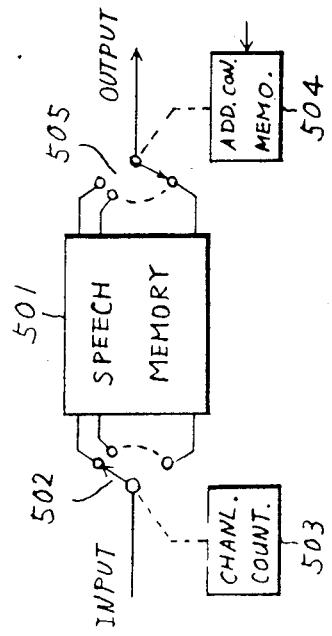
FIG. 2 is a schematic view of a T-switch used in the known network.

Referring to FIG. 2, T-switch has a speech memory 501 of, such as an RAM. Speech memory 501 has addresses assigned to time slots in a frame of the time division multiplex signal on an input highway. The addresses are selected by an address selector 502 under control of a channel counter 503, so that digital data signals in time slots of each one frame on an input highway 3 are stored into the assigned addresses of speech memory 501. The T-switch has another RAM, or an address control memory 504 in which data indicating an order of the addresses of speech memory 501 to be read out are written by control unit 9. Another address selector 505 selects addresses in speech memory 501 according to the data stored in memory 504 and the stored data are read out from speech memory 501 in the order onto an output highway. Thus, the time slot interchange is carried out, that is, the digital data signals can be replaced between different time slots by address interchange between the storing operation and the reading-out operation of speech memory 501.

Figure 3:
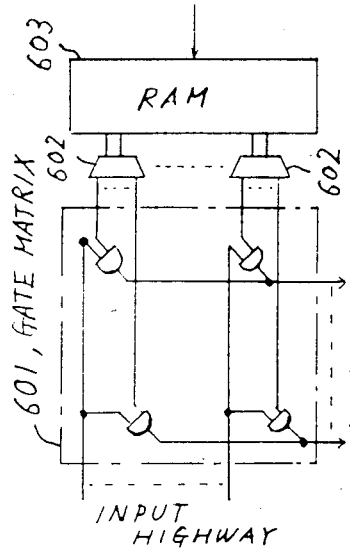
FIG. 3 is a schematic view of an S-switch used in the known network.

Referring to FIG. 3, S-switch has a gate matrix circuit 601 having a plurality of input terminals connected with input highways and a plurality of output terminals connected with output highways. Each gate of gate matrix circuit 601 is controlled by control signals from decoders 602. Each decoder 402 reads out data from an RAM 603 in which the data indicating gates to be opened are written by control unit 9. Thus, the digital data signal in a time slot on an input highway can be sent out into a time slot on a different output highway under control of decoders 602 according to the data stored in memory 603. Thus, the time slot interchange can be performed between different highways.

The known time division switching network as described above can carry out the desired exchange between different channels. However, it is very complicated in the system because a plurality of speech memories must be used together with respective control circuits. Further, another control circuit is also required for control of the gate matrix circuit of the S-switch.

The present invention can provide a time division switching network with a simple circuit formation.

Figure 4:
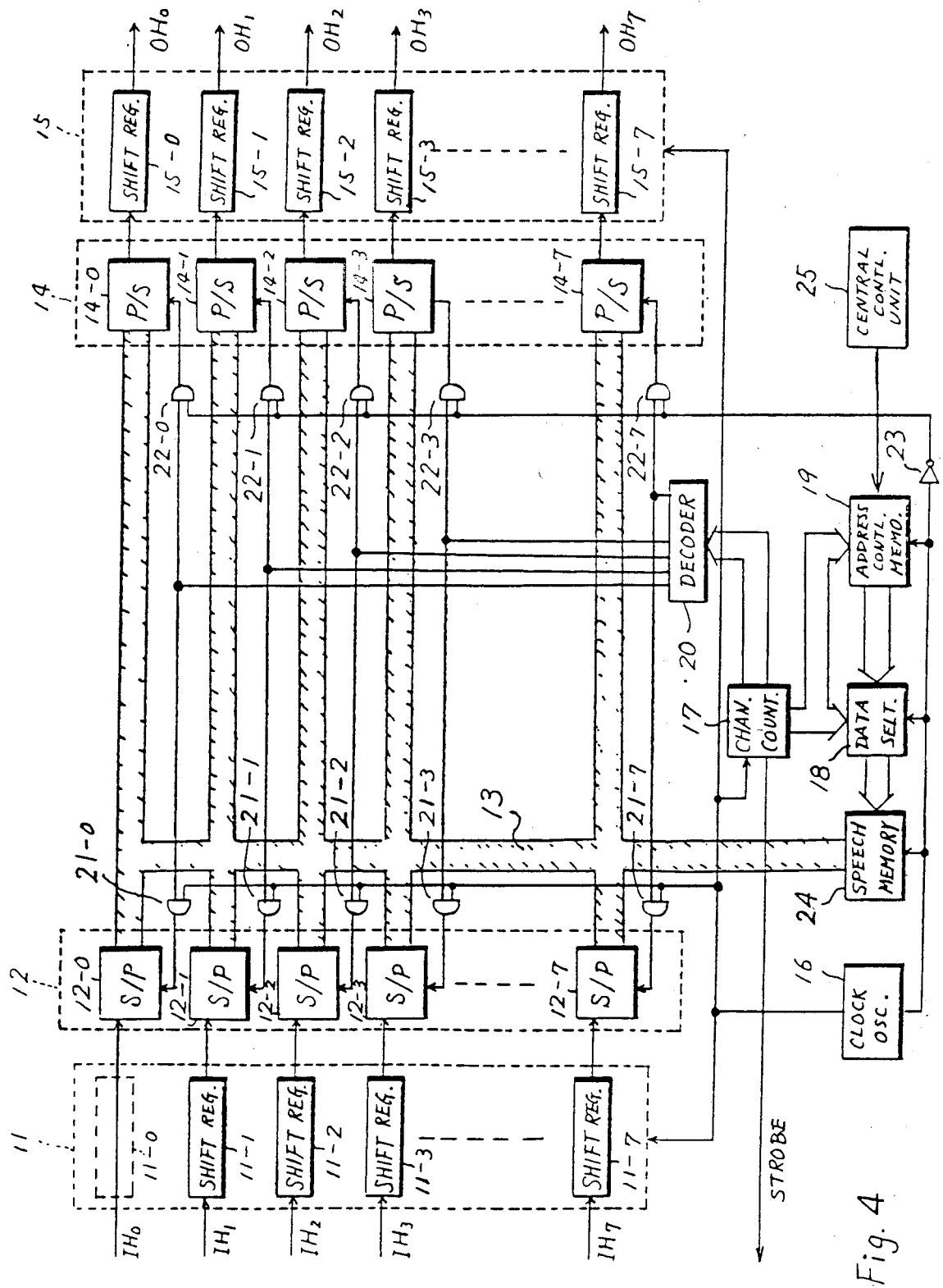
FIG. 4 is a block diagram view of an embodiment of the present invention.

Referring to FIG. 4, a time division switching network of an embodiment according to the present invention as shown therein is also connected to line collectors through input highways (8 highways $IH_0$-$IH_7$ are shown) and output highways (8 highways $OH_0$-$OH_7$ are also shown).

Eight highways $IH_0$-$IH_7$ are connected to eight shift registers 11-0, 11-1, . . . , 11-7, respectively.

In this embodiment, it is provided that the digital data in a time slot in a frame of the time division multiplex signal on each highway have 8 bits.

Shift registers 11-0 is a zero stage register, that is, no shift register is used in the present embodiment. Shift registers 11-1, 11-2, 11-3, . . . , 11-7 are one-stage, two-stage, three-stage, . . . , and seven-stage shift registers, respectively. These shift registers 11-1, . . . , 11-7 are controlled by clock pulses as will be described hereinafter.

Outputs of shift registers 11-0, . . . , 11-7 are connected to serial-parallel converters 12-0, 12-1, . . . , 12-7, respectively.

In the present embodiment, highway $IH_0$ is directly connected to serial-parallel converter 12-0 because shift register 11-0 is not used, as described above.

Each serial-parallel converter 12 converts the input serial data of 8 bits into parallel data of 8 bits. Each serial-parallel converter 12 has an output gate circuit (not shown) and sends out the parallel data of 8 bits onto a data bus 13 connected thereto at a time when the output gate circuit is opened.

Outputs of serial-parallel converters 12-0, 12-1, . . . , 12-7 are connected to inputs of eight parallel-serial converters 14-0, 14-1, 14-2, . . . , 14-7 through the common data bus 13. Each parallel-serial converter 14 has an input gate circuit (not shown). The converter 14 receives the parallel data of 8 bits on data bus 13 at a time when the input gate circuit is opened, and converts the parallel data of 8 bits into the serial data of 8 bits.

Outputs of parallel-serial converters 14-0, 14-1, . . . , 14-7 are connected to shift registers 15-0, 15-1, . . . , 15-7, respectively. Shift registers 15-0, 15-1, 15-2, . . . , 15-7 are eight-stage, seven-stage, six-stage, . . . , one-stage shift registers, respectively, and are controlled by the clock pulses as will be described hereinafter.

Outputs of shift registers 15-0, 15-1, . . . , 15-7 are connected to output highways $OH_0$, $OH_1$, . . . , $OH_7$, respectively.

Figure 5:
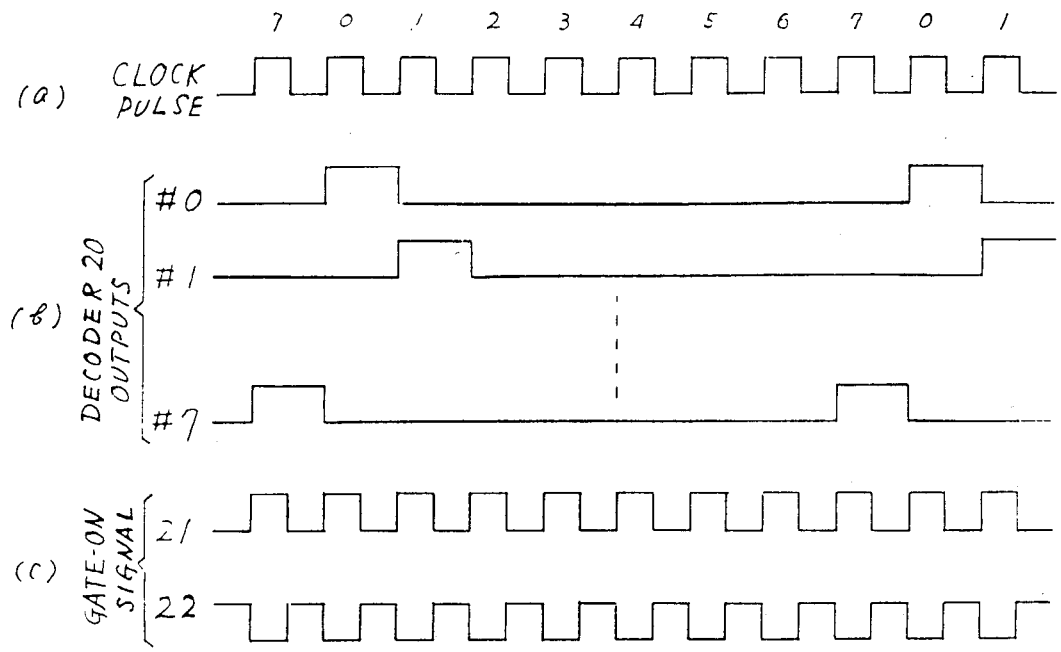
FIG. 5 is a view illustrating signals of different portions in FIG. 4.

A pulse oscillator 16 generates clock pulse signals with a repetition frequency as shown at (a) in FIG. 5 which is equal to the repetition frequency $f_p$ of bit signals in the time slot on the highway. The clock pulses are applied to shift registers 11 and 15, which are operated in phase of data bit pulses inputted therein.

The clock pulses are also applied to a channel counter 17 and are counted up thereat.

Channel counter 17 counts up input pulses and is reset at a time when input pulses are counted up by a number which is equal to a product of a number of time slots in one frame of the time division multiplex signal and the number of data bits in one time slot.

Since the number of data bits of one time slot is 8 in the present embodiment as described above, channel counter 17 is reset at a time when the number counted therein is 192 (=24×8), providing that the number of time slots in a frame is 24.

The count of channel counter 17 is outputted as a binary code and are applied to a data selector 18 and an address control memory 19 of an RAM. The lower three bits of the output from channel counter 17 are applied to a decoder 20.

Decoder 20 has eight (8) output terminals on which control signals are outputted in response to different eight input binary data, respectively. That is, when all of three bits from channel counter 17 are "0", the control signal or a high level signal is outputted on a #0 output terminal while the other output terminals are at a low level. When binary data "001" are inputted, the control signal is outputted on a #1 output terminal. In such a way, the control signal is presented on output terminals #2, #3, ..., #7, sequentially and alternatively in response to increment of the binary number from channel counter 17, as shown at (b) in FIG. 5.

An output terminal #1 of decoder 20 is connected to serialparallel converter 12-0 through a gate 21-0 and to parallel-serial converter 14-0 through a gate 22-0, so as to control the output gate circuit of the serial-parallel converter and the input gate circuit of the parallel-serial converter. In similar manners, output terminals #1-#7 are connected to serial-parallel converters 12-1-12-7 and parallel-serial converters 14-1-14-7 through gates 21-1-21-7 and gates 2-1-22-7, respectively.

A control terminal of each gate 21 is connected to the output of clock pulse oscillator 16, while a control terminal of each gate 22 is connected to the output of clock pulse oscillator 16 through an inverter 23. Therefore, when gates 21 are opened, gates 22 are closed, while gates 22 open when gates 21 are closed, as shown at (c) in FIG. 5.

Since the clock pulses are counted at channel counter 17, gates 21 and gates 22 are alternatively opened during a time period when the control signal is outputted on one output terminal of decoder 20, as clearly understood from (b) and (c) in FIG. 5.

Figure 6:
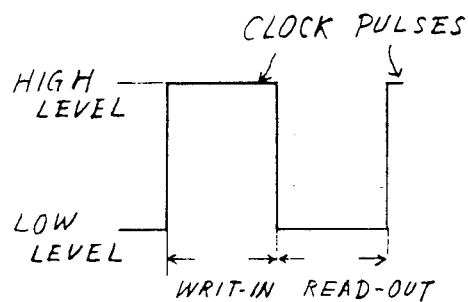
FIG. 6 is a view for explaining operations of a memory in response to a clock pulse.

A speech memory 24 of an RAM is connected to common data bus 13 for temporarily storing data on data bus 13 and for reading out the stored data onto data bus 13. Speech memory 24 has a plurality of selectable addresses and the number of addresses is equal to the product of a number of time slots in one frame of the time division multiplex signal and the number of highways, that is, has 192 (=24×8) addresses. Speech memory 24 carries out to store the data on data bus 13 into an address given from data selector 18 in response to each high level signal of clock pulses from oscillator 16, and to read out the data stored at an address inputted from data selector 18 in response to each low level signal of clock pulses from oscillator 16, as shown in FIG. 6.

Data selector 18 is a circuit for selecting one of two input data signals under control of an input control signal and sending out the selected one. In the embodiment, the count of channel counter 17 and data read out from address control memory 19 are inputted to data selector 18, which is controlled by clock pulses from oscillator 16. Thus, data selector 18 selects the count number from channel counter 17 in response to each high level signal of the clock pulses thereto from oscillator 16, and sends out to speech memory 24 the count number as an address number. On receiving each low level signal of the clock pulses from oscillator 16, data selector 18 selects the data from address control memory 19 and sends out the selected data to speech memory 24.

Address control memory 19, which is an RAM, has a plurality of selectable addresses of a number equal to the address number of speech memory 24. Address control memory 19 receives the count number from channel counter 17 and operates to read out the data stored in an address represented by the count number in response to each low level signal of the clock pulses from oscillator 16.

Central control unit 25 writes data of addresses of speech memory 24 to be accessed into respective addresses of address control memory 19 during every high levels of the clock pulses from oscilltor 16.

When channel counter 17 counts up its maximum count number, it outputs a strobe pulse to terminal interface 2 (FIG. 1), so that new frames are sent out to highways $IH_0$–$IH_7$.

Next, operation of the switching network will be described below.

In operation, clock pulses from oscilltor 16 are counted up at channel counter 17. Upon counting up to the maximum count number, channel counter 17 outputs the strobe pulse, and then, reset to again start the count-up operation of the clock pulses. The operation of channel counter is repeated.

In response to each strobe pulse from channel counter 17, each line collector 2-1-2-N in FIG. 1 sends out each one frame of the time division multiplex signals on each highway of $IH_0$–$IH_7$. Data signals of the frames on highways $IH_0$–$IH_7$ are applied to serialparallel converters 12-0-12-7 through shift registers 11-0-11-7, respectively, and are converted into parallel data at respective converters 12-0-12-7. Since outputs from shift registers 11-0-11-7 are obtained at one bit delays, serial-parallel conversion at serial-parallel converters 12-0-12-7 is carried out at one bit delays.

As described above, gates 21-0-21-7 are repeatedly opened by the clock pulses (see 21 in FIG. 5) which is in phase of the data bit signals, and the control signal is outputted on output terminals #0-#7 of decoder 20 alternatively and repeatedly and in phase of the clock pulse. Therefore, serial-parallel converters 12-0-12-7 are sequentially accessed at one clock pulse delays.

When parallel data is read out from one serial-parallel converter, for example, 12-0, the data is stored in speech memory 24 under control of the clock pulse. The address of speech memory 24 to be stored is given by the current count number, for example, eight (8) of channel counter 17 which is selected by data selector 18 under control of the clock pulse.

In response to the next clock pulse, parallel data in serial-parallel converter 12-1 is read out on data bus 13 and stored in speech memory 24 at an address of nine (9). Thereafter, respective data in serial-parallel converters 12-1-12-7 are sequentially read out and stored at subsequent addresses in speech memory 24 in response to subsequent clock pulses.

After the parallel data of serial-parallel converter 12-7 is stored in speech memory 24, the control signal is again outputted on #0 output terminal of decoder 20 as shown at (b) in FIG. 5 in response to the next clock pulse. Therefore, the parallel data of the next time slot is read out from serial-parallel converter 12-0 and stored at the next address, or sixteenth (16th) address in speech memory. Thereafter, similar operation is carried out in response to subsequent clock pulses. As a result, data in all time slots in each one frame on the input highways $IH_0$–$IH_7$ are stored in speech memory 24.

Similar operation are carried out to the next frame sent out on each highway of $IH_0$–$IH_7$ in response to the next strobe pulse from channel counters.

Read-out operations of speech memory 24 are carried out at every intervals between adjacent clock pulses, that is, every low level intervals of clock pulse oscillator 16, as described above. The data of address of speech memory 24 to be accessed at each read-out operation are given from address control memory 19 through data selector 18.

The data read out from speech memory 24 at each read-out operation is inputted to one of parallel-serial converters 14-0–14-7 which receives the control signal from decoder 20 through one gate 22 opened.

As described above, during a time period when the control signal is outputted on, for example, #0 output terminal of decoder 20, gate 21-0 is opened and thereafter closed, while gate 22-0 is closed and thereafter opened. Therefore, after storing operation of data of serial-parallel converter 12-0 into speech memory 24 is completed, data read out from speech memory 24 at the subsequent read-out operation is taken into parallel-serial converter 14-0. In the similar manner, data in serial-parallel converters 12-1–12-7 are stored in speech memory 24, and respective data read by in read-out operations subsequent to respective storing operations are taken into parallel-serial converters 14-1–14-7, respectively.

Thus, the data bit signals in one time slot read out from speech memory 24 are converted into serial signals at the parallel-serial converter.

Outputs of parallel-serial converters 14-0–14-7 are sent out to respective output highways $OH_0$–$OH_7$ through shift registers 15-0–15-7, respectively, by which time slots are matched between output highways $OH_0$–$OH_7$.

It will be understood from the above description that the channel exchange or the time slot interchange can be performed by address data written into address control memory 19 by central control unit 25.

For example, data of first time slot in one frame of the time division complex signal on input highway $IH_0$ are stored at 8th address in speech memory 24 and data of first time slot in one frame of the time division complex signal on input highway $IH_1$ are stored at 9th address in speech memory, in accordance with the address data given by count numbers of channel counters 17, as described above.

Providing that address data of "9" and "8" are written into 8th and 9th addresses of address control memory 19, data stored in 9th address and data stored in 8th address of speech memory 24 are sent out onto output highways $OH_0$ and $OH_1$, respectively. Thus, the time slot interchange is realized between first time slots on highways $H_0$ and $H_1$, that is, channel exchange is effected.

The present invention has been described in connection with a specific embodiment, but it is example only. It will be easily understood that the present invention can be applied to another system where increased or decreased number of highways are used, where the number of time slots in one frame is decreased or increased or where the number of bits in one time slots are decreased or increased in comparison with the embodiment as described above.

What is claimed is:

1. A time division switching network for interchanging time slots on a plurality of (N) highways, each highway transmitting a time division multiplex signal, each one frame of the time division multiplex signal having a predetermined number (n) of time slots assigned to n channels respectively, and each time slot having a plurality of (m) data bits with predetermined time intervals, which comprises:
   N input highways receiving incoming time division multiplex signals;
   N output highways transmitting the time division multiplex signals as exchanged;
   clock pulse generator means generating clock pulses in phase with the data bits;
   N buffer memory means connected to N input highways and storing data in the time slots inputted thereto;
   a first random access memory having a plurality of addresses, the number of the addresses being equal to a product of the predetermined number (n) of the time slots in one frame and the number (N) of the input highways;
   first means for writing one time slot data stored in said N buffer memory means into respective addresses in said first random access memory in response to the clock pulses;
   second means for reading out the data stored in respective addresses in said first random access memory onto respective ones of said N output highways in response to every time interval between adjacent clock pulses;
   a second random access memory storing address data of said first random access memory to be accessed by said second means;
   third means for matching time slots on said N output highways; and
   a central control unit for writing said address data into said second random access memory.

2. The time division switching network as claimed in claim 1, wherein said N buffer memory means comprises N shift registers having outputs and N serial-parallel converters connected to the outputs of said shift registers, respectively, said N shift registers having different number of stages one by one.

3. The time division switching network as claimed in claim 1, wherein said first means comprise a common data bus connected to said N serial-parallel converters, a channel counter counting up said clock pulses, N first gate means being opened by said clock pulses and connected to said N serial-parallel converters, respectively, and an access signal generator means for selecting one of said N first gate means in dependence on the count number of said channel counter and sending out an access signal to the selected one of said N first gate means, whereby one of said N serial-parallel converters is accessed by said access signal and the one time slot data in the one serial-parallel converter are written into an address given by the count number of said channel counter of said first random access memory through said common data bus.

4. The time division switching network as claimed in claim 3, wherein said second means comprises N parallel-serial converters being connected to said common data bus, N second gate means being opened by every interval between adjacent ones of said clock pulses and connected to said N parallel-serial converters, respectively, said access signal generator means selecting one of said N second gate means in dependence on the count number of said channel counter and sending out the access signal to the selected one of said N second gate means, whereby one of said N parallel-serial converters is accessed by said access signal to take thereinto the data read out onto said common data bus from said first random access memory.

5. The time division switching network as claimed in claim 4, wherein said access signal generator means is a decoder having N output terminals, said N output terminals being connected to said N first and second gate means, respectively.

6. The time division switching network as claimed in claim 4, which further comprises data selector means selecting one of the count number of said channel counter and the address data read out from said second random access memory in dependence on each clock pulse and each time interval of said clock pulses, respectively, the selected one being applied to said first random access memory as the address data to be accessed.

7. The time division switching network as claimed in claim 6, wherein said second random access memory is accessed according to address data given by the count number of said channel counter.

* * * * *